Feb. 8, 1944.   E. W. CHAFEE ET AL   2,340,865
ANTIAIRCRAFT FIRE CONTROL DIRECTOR
Filed Oct. 19, 1937   5 Sheets-Sheet 3

Feb. 8, 1944.  E. W. CHAFEE ET AL  2,340,865
ANTIAIRCRAFT FIRE CONTROL DIRECTOR
Filed Oct. 19, 1937  5 Sheets-Sheet 4

INVENTORS
EARL W. CHAFEE
SHIERFIELD G. MYERS
BY
THEIR ATTORNEY

Feb. 8, 1944.   E. W. CHAFEE ET AL   2,340,865
ANTIAIRCRAFT FIRE CONTROL DIRECTOR
Filed Oct. 19, 1937   5 Sheets-Sheet 5

Fig. 9

INVENTORS
EARL W. CHAFEE and
SHIERFIELD G. MYERS
BY
   ATTORNEY

Patented Feb. 8, 1944

2,340,865

UNITED STATES PATENT OFFICE 2,340,865

ANTIAIRCRAFT FIRE CONTROL DIRECTOR

Earl W. Chafee, New York, and Shierfield G. Myers, Freeport, N. Y., assignors to Sperry Gyroscope Company, Inc., Brooklyn, N. Y., a corporation of New York Application October 19, 1937, Serial No. 169,764

8 Claims. (Cl. 235—61.5)

This invention relates to fire control directors, particularly of the anti-aircraft type, wherein the relative speed and also the angular elevation of the target are great. This invention discloses in greater detail how the rate determining and introducing means disclosed in prior Patent No. 2,206,875, dated July 9, 1940, for Fire control directors, Earl W. Chaffee and Bruno A. Wittkuhns, inventors, is applied to a modern director of the type disclosed in the prior patent to Earl W. Chafee, Shierfield G. Myers, and Hugh Murtagh, No. 2,065,303, dated December 22, 1936, for Apparatus for the control of gunfire. The present application is therefore a continuation in part and further amplification of the aforesaid patents.

Further improvements effected by our invention include an improvement in the contact system for controlling the range difference and azimuth difference motors and in the provision of special stop devices so that the variable speed drive may be reset when the limit of movement of the present or future resolving mechanism is approached.

Another improvement consists in the simplification of the rectilinearly moving slides of the resolving mechanism, and a further improvement is made in the irreversible setting means for setting in the several operating factors, such as elevation and azimuth angles, into the machine.

Referring to the drawings illustrating the invention largely in diagram form.

As explained in the said prior patent, the sights S and S' are preferably mounted on the director itself for rotation therewith in azimuth, but are rotated together in elevation on the director. The said sights are maintained on the target by the elevation handwheel EH which turns the sights in elevation through gearing 150, shaft 151 and worm wheel 152. At the same time the angular elevation appears at $E_0$, index 9', readable on dial 10, being turned through shaft 153. The azimuth handwheel AH rotates the entire director and sights around a fixed gear 1 on the pedestal of the instrument. Altitude is also continuously introduced into the machine from a height finder (not shown) the readings of which are transmitted to the director operators in any suitable manner, as by telephone, and the indicated altitude being actually set into the machine by handle H, which is turned until the indicator counters $H_0$ read the proper altitude. The angular elevation appears at 9'—10 on the $E_0$ indicator and the azimuth angle appears on the azimuth dial $A_0$.

As explained in the aforesaid patent, horizontal range $(R_0)$ is used as one of the principal factors introduced into the computing mechanism. One method of determining this from the elevation angle $E_0$ and altitude $H_0$ is by mechanically solving the equation $$R_0 = \frac{H_0}{\tan E_0}$$

This may be conveniently done by the use of a three dimensional cam 2, said cam being positioned laterally by means of a shaft 3 on which the support for the cam is threaded, said shaft being turned from the range setting handle 4. The cam is also rotated in accordance with altitude from the handwheel H, which also turns the altitude indicators $H_0$. The lift of the cam pin 5 rotates, through a rack and pinion 6 and shafts 7 and 8, a pointer 9 of the angular elevation indicator $E_0$. The cam is so laid out that with the correct height and elevation angle set into the machine, i. e., with indicators $H_0$ showing the correct altitude and index or pointer 9 matching index 9' on indicator $E_0$, the angular displacement of shaft 3 and the shafts directly connected to it will be a measure of the horizontal range (Ro). This quantity is indicated on the Ro indicator driven from shaft 18.

As the elevation angle changes, the operator of handle 4 preferably changes to the range rate handle 11. This handwheel turns a rate dial 12 and positions the shiftable member of a variable speed device 13. As shown, this positions a roller or ball carriage 14 operating between a disc 15, driven from a constant speed motor 16, and a cylinder 17. Said cylinder operates the same shaft 18 as the handwheel 4 through a differential 19. Thus, when the handle 11 is set so that the follow-the-pointer indicators 9 and 9' stay matched, the correct rate of change of range has been set up. Displacement handwheel 4 may be operated while a constant rate of change of range is being fed in by device 13. In this case, due to the action of differential 19, the resultant rotation of shaft 18 represents the difference of the two rotations due to handwheel 4 and device 13, respectively. It is to be noted that it is possible to rotate handwheel 4 at a faster rate than the maximum rate which can be set in by device 13.

Similarly, the azimuth angles are set in from the handwheel AH through shafts 20 and 21, the latter being connected to the present resolving mechanism 22 through shaft 23 and to the future resolving mechanism through shaft 24, differential 53 and shaft 51. Said two mechanisms are of substantially the same construction.

Figures 2, 3, 4, 5:
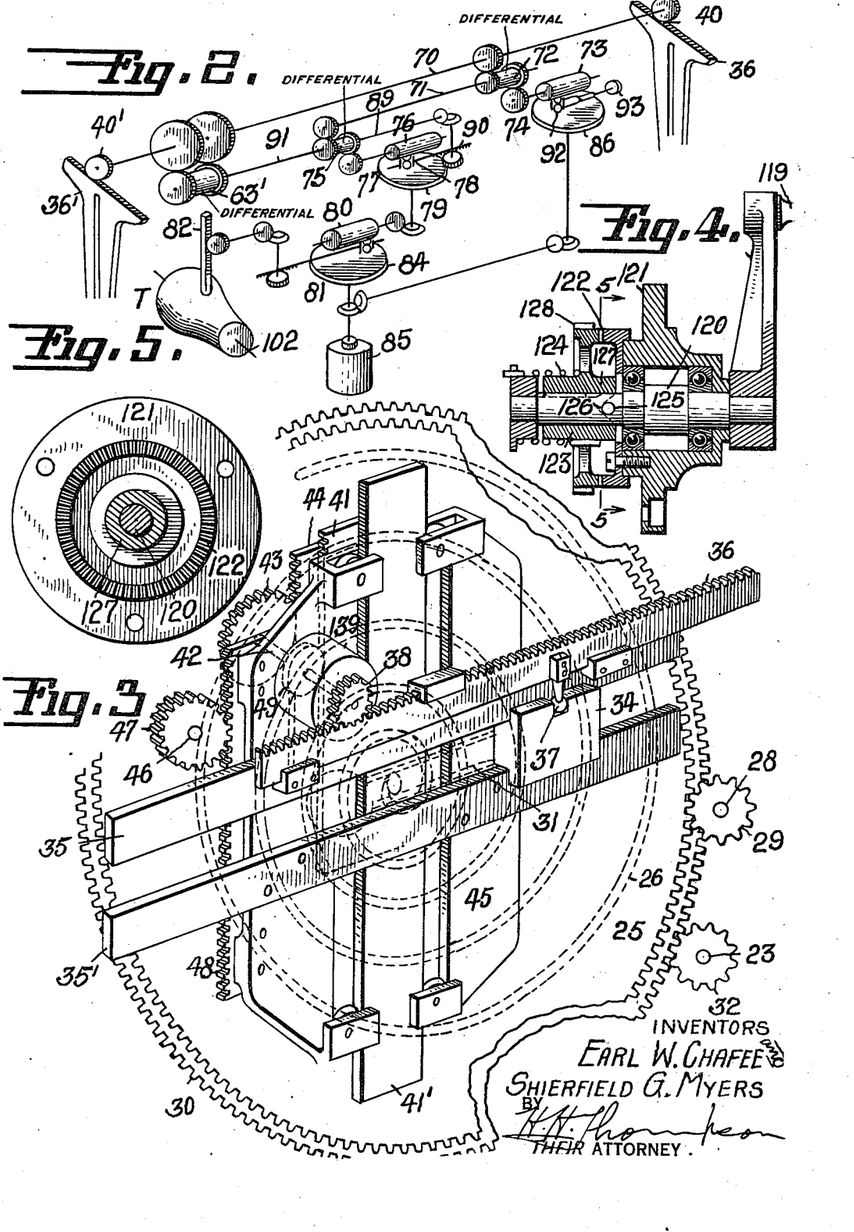
Fig. 2 is a diagrammatic view showing on a larger scale and in perspective one arrangement of the mechanism for determining the target displacement during the time of flight of the shell and hence the future target position, this figure being substantially the same as Fig. 5 of the aforesaid prior application.
Fig. 3 is diagrammatic showing of one of the resolving mechanisms, which includes an improved arrangement of slides.
Fig. 4 is a sectional view of one of the improved self-locking setting handles.
Fig. 5 is a cross-section of the same taken on line 5—5 of Fig. 4.

A pseudo-perspective diagram of one of the mechanisms is shown in Fig. 3. The relative positions of certain of the parts have been arbitrarily chosen in this view to simplify the arrangement for purposes of explanation. For a practical arrangement of parts which may be adopted in a preferred form of resolving mechanism according to our invention, reference may be had to Fig. 7 which shows a section taken along the horizontal diameter of the resolving discs or gears.

Figures 6, 7, 8:
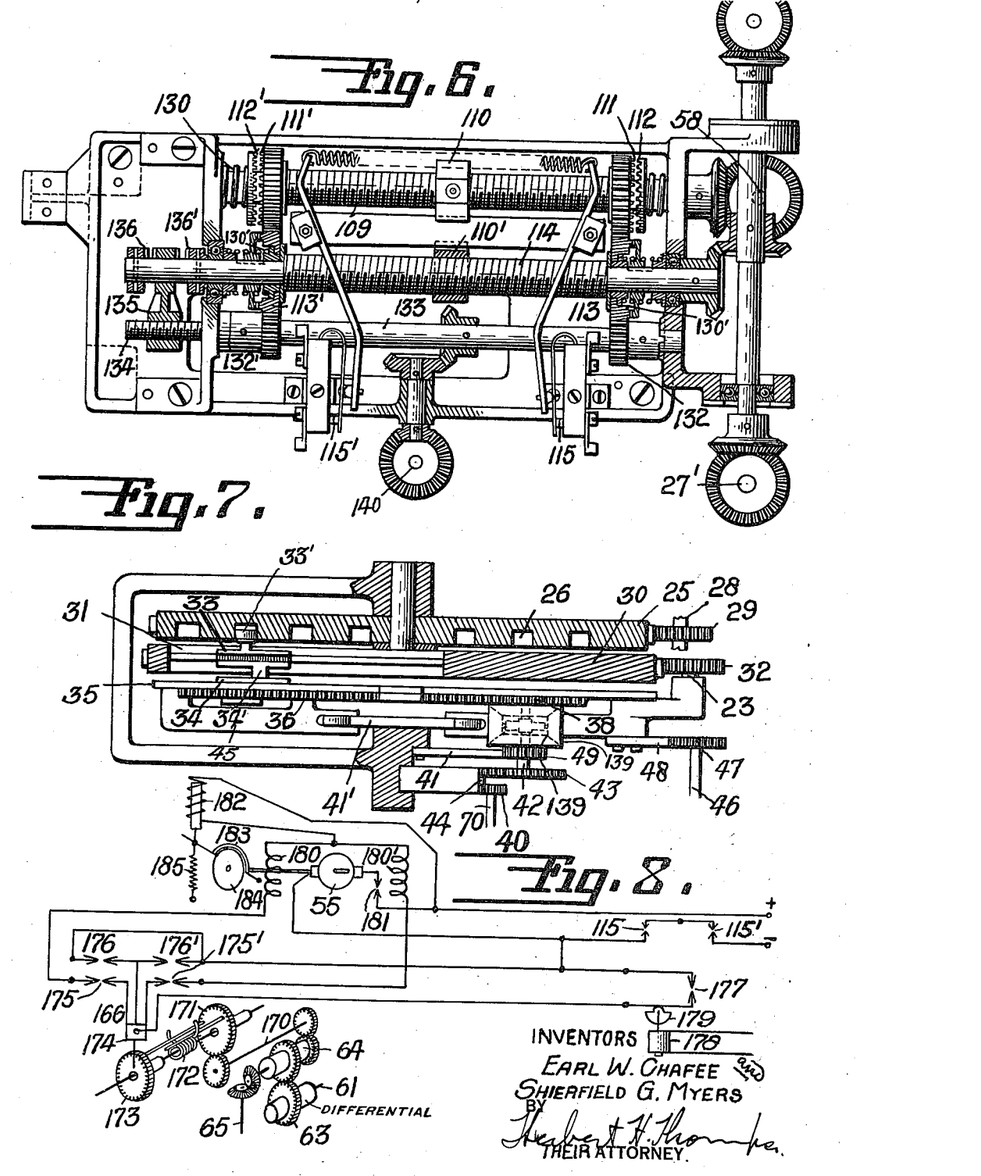
Fig. 6 is a plan view, partly in section, of the improved stop mechanism for the resolving devices.
Fig. 7 is a horizontal section through the resolving mechanism.
Fig. 8 is a wiring diagram of electrical connections according to one form of the invention.

Each mechanism may comprise a large vertical disc or gear 25 having a spiral groove 26 on one surface. In the case of the mechanism for resolving present target position, said gear is turned from range shaft 18 through shafts 27 and 27', differential 39, shaft 28 and pinion 29, the last named element not appearing in the schematic showing of Fig. 1A. Alongside of gear 25, or underneath it as seen in Fig. 7, is a second concentrically mounted disc or gear 30 having a radial slot 31 therein and which is rotated by a pinion 32 on shaft 23. In said radial slot is slidably mounted a block 33 having upwardly and downwardly extending pins thereon, the upper pin 33' engaging spiral groove 26 in gear 25 and the lower pin 34' engaging a hole in a second block 34. The latter block is slidably mounted for lateral movement only between two horizontal bars 35 and 35' (Fig. 3) fixedly secured to a roller carriage 45. Also slidably mounted above block 34 is a rack bar 36 connected with the block 34 through a pin and slot connection 37. Engaging the teeth of said rack bar is a pinion 38 connected to one arm of differential 139. In order to avoid confusion of elements, this differential is shown in the diagrammatic view of Fig. 3 as being in the rear of rack 36, whereas it is found in the form of construction shown in Fig. 7 in front of rack 36.

A second arm of differential 139 is provided with a pinion 49 engaging a vertical rack bar 41 secured to a fixed guide bar 41' on which roller carriage 45 is guided for vertical motion.

The third arm of said differential is connected to a shaft 42 provided at its outer end with a gear 43 which engages a third vertically slidable rack bar 44.

Since the angular position of the radial slot 31 in disc 30 represents the azimuth angle Ao and the radial position of the slide block 33 which is determined by the angular position of spirally grooved disc 25 represents horizontal range Ro, the position of block 34 (driven from block 33 by pin 34') in the plane in which it moves, represents the projection of the target position on the ground plane. Block 34 is constrained to move horizontally by bars 35 and 35'. The horizontal displacement of block 34 from a central position, therefore, represents one Cartesian coordinate of the target position in the ground plane, for example, the $x$ coordinate, while the displacement of the block and guide bars 35 and 35' in a vertical direction, which is transmitted to roller carriage 45, represents the other or $y$ coordinate. It is seen, therefore, that the resolving mechanism converts the polar coordinates Ao and Ro into rectilinear or $x$, $y$ coordinates in the plane of the ground. The up and down movement of the roller carriage 45 representing the $y$ component, may be transmitted to the shaft 46 through a pinion 47 meshing with a rack bar 48 on said roller carriage. The $x$ component in addition to being represented by the movement of block 34 is also represented by the movement of the rack bar 44, since this bar is moved by the lateral movement of the bar 36, driven by block 34, from which the vertical movement of the carriage has been subtracted by means of the differential 139. The movements of the bar 44 are taken off by the pinion 40 and shaft 70. The subtraction of the vertical motion of carriage 45, that is, of the vertical component of the motion of block 34 relative to the frame, by differential 139 prevents this motion appearing as a rotation of pinion 40 and shaft 70. The rotation of these members therefore represents the horizontal displacement of block 34 only.

Figure 1A:
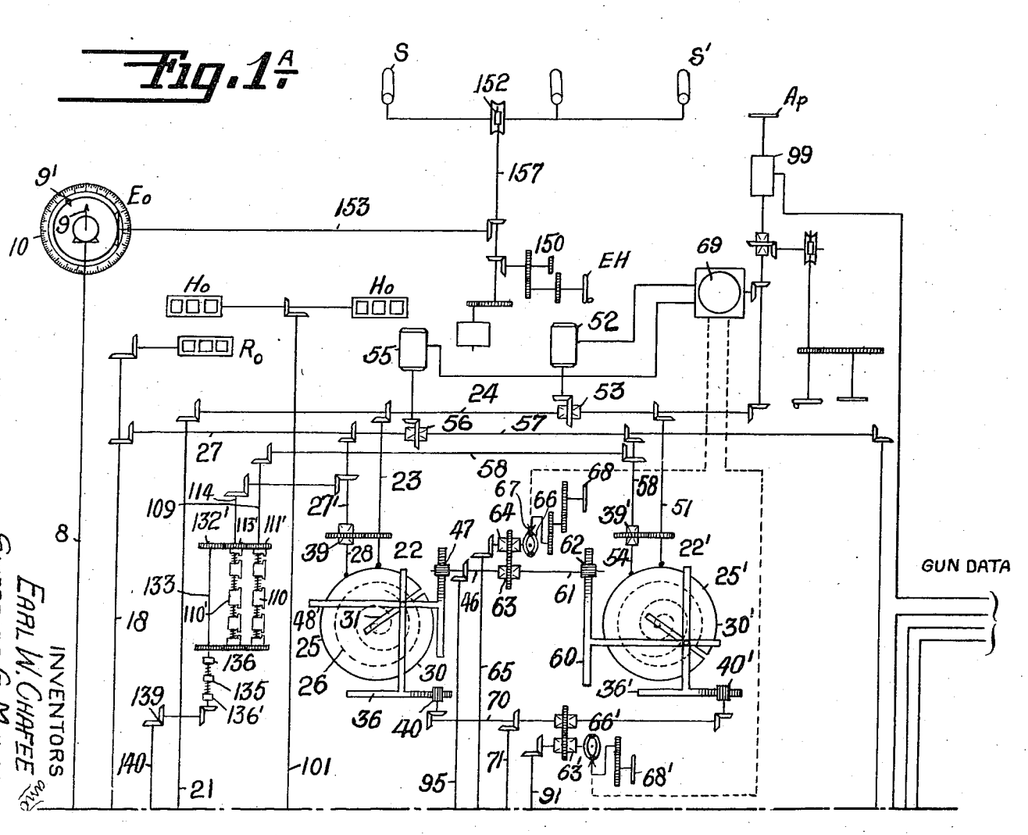
Figs. 1A and 1B are the two halves of a diagram showing the principal component parts of our invention, corresponding fairly closely to the general layout of Figs. 1A and 1B in the aforesaid Patent #2,065,303.
Figure 1B:
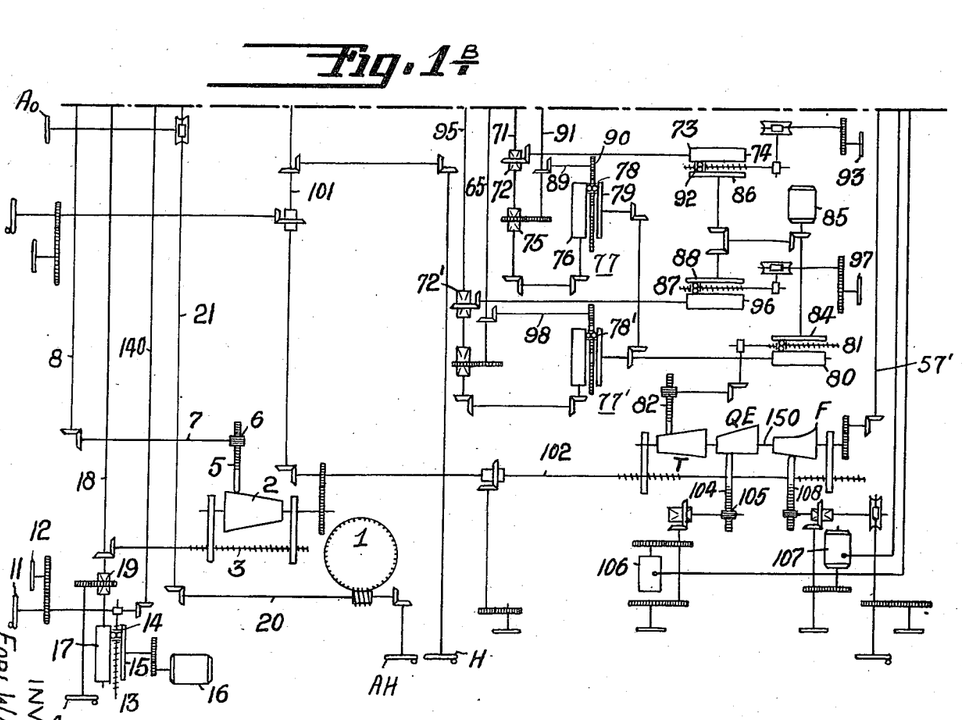

In the diagrammatic form shown in Figs. 1A and 1B, the simple form of resolving mechanism shown in the previous patent has been retained, as this discloses the principles involved in a simpler manner, and the parts are correspondingly numbered where possible. In these figures certain parts shown in Figs. 3 and 7 of the present application are omitted. For example, rack 36 is shown as driving pinion 40 directly instead of through the intermediate members described above. The differential 39 and the back connection between shafts 23 and 27' are for the purpose of preventing the range from being changed when only the azimuth angle is being changed due to the spiral slot arrangement.

Figure 9:
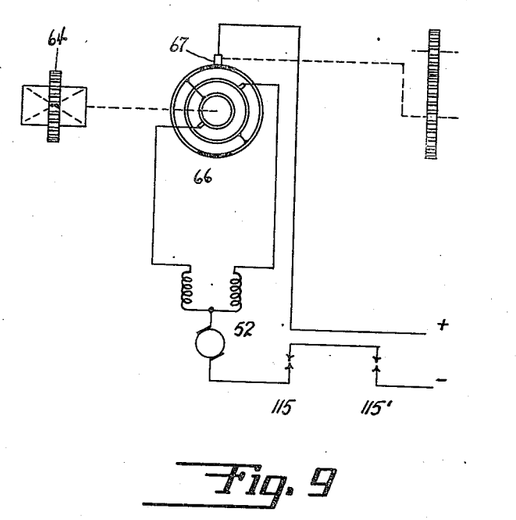
Fig. 9 is a diagram of electrical connections according to another form of the invention.

The future resolving mechanism may be quite similar in construction, but in this case the azimuth gear 30' is rotated by a shaft 51 driven not only from the present azimuth bearing shaft 24, but also from an azimuth difference motor 52 or change of bearing angle motor through a differential 53. Similarly, the range gear 25' is driven from a shaft 54 which is rotated not only by the shaft 27, but also from the range difference motor 55 through a differential 56, shafts 57 and 58 and differential 39'. The vertically movable slide 60 in this instance is shown as turning shaft 61 through rack and pinion 62, said shaft driving one side of a differential 63, the other side being driven from the shaft 46 from the present resolving mechanism. The middle arm of said differential, therefore, is only turned through a distance representing the difference of the $y$ components of the future and present target position or the change of $y$ position during the time of flight of the shell, which factor is also introduced into a second differential 64 by way of a first arm thereof, a second arm being connected to shaft 65 leading to the prediction or change of target position calculating mechanism. The third arm of said differential 64 carries a zero reading contact drum 66 cooperating with a normally fixed brush 67 in circuit with one of the range or azimuth difference motors 52, 55 (Fig. 9), so that said motor will drive the range disc 25' until the brush is brought to a position on the insulated sector on the drum or in other words until the factor introduced into the mechanism 22' by the motors 52 and 55 matches the predicted change of target position from shaft 65. A hand setting device 68 may be provided for shifting the position of said brush to introduce a correction for parallax due to the difference in the $y$ position between the director and the battery to which data is being transmitted. Similar mechanism is shown at 66' for driving the other difference motor, and which is provided with a similar mechanism 68' for introducing the $x$ component parallax correction.

As more fully explained in the aforesaid patent, it is necessary to transfer the function of the range difference and azimuth difference motors 52, 55 for certain angular positions of the azimuth gear 30', and this may be accomplished with a quadrant switch 69, with which the present invention is not concerned so that in certain angular positions, contact 66 controls the range motor and contact 66', the azimuth motor, while in other positions the opposite is true.

In order to prevent the variable speed drive 13 or handwheel 4 from moving the sliding block 33 on the resolving disc of the present resolving mechanism or the corresponding sliding block of the future resolving mechanism to the limit of its movement in either direction, we provide a special stop arrangement shown in Fig. 6. In this figure, in the portion relating to the future range drive stop, a threaded shaft 109 is driven from the range shafts 58 of the future resolving mechanism, and on said shaft is threaded a nut 110 which is hence caused to travel in one direction or the other from its central position dependent on the direction of rotation of shaft 109. On said shaft are freely mounted two pairs of normally disengaged clutch members 111, 112 and 111', 112', having toothed inner surfaces. The two parts of each clutch are yieldingly held spaced by a compression spring between them (not shown but similar to springs 130') and the outer part of each pair is splined to the shaft. When the nut 110 strikes either clutch member 111 or 111', said member is pushed into engagement with the jaws on the other member to thereby cause member 111 or 111' to rotate. Members 111, 111' are provided with gear teeth meshing with teeth on similar clutch members 113, 113' on threaded shaft 114 driven from the present range shaft 27'. Shaft 114 is also provided with a traveling nut 110' for actuating the clutches associated with it, which provides a stop on the present range drive as will be presently described.

The teeth on clutch members 113, 113' mesh, respectively, with pinions 132 and 132' on a common shaft 133, on an extension 134 of which is threaded a nut 135 also freely journaled on an extension of shaft 114. Nut 135 has a single clutch tooth cut on each of the opposite faces of the portion movable along shaft 114. When shaft 133 is revolved sufficiently in either direction from the position shown in Fig. 6, one or the other of the clutch teeth on nut 135 comes into engagement with a cooperating tooth on one or the other of collars 136, 136' pinned to the shaft 114, so that the shaft 114 alone or shafts 114 and 109 are prevented from rotating, dependent on whether a clutch on the shaft 114 or shaft 109 is engaged. The aforesaid rotation of shaft 133 will not only stop rotation of the present range disc 25, but will stop any rotation of the shaft 18 by the variable speed device as follows: The shaft 133 is connected through bevel gears 139 and shaft 140 to handle 11 and ball carriage 14 of variable speed gear 13. Nut 135 stands midway between collars 136 and 136' when ball carriage 14 is in its central or zero position. Whenever the maximum operating rate in one direction is set in by the displacement of ball carriage 14 to the limit of its travel on one side of the zero position, nut 135 is displaced from its mid position until it just clears collar 136 or 136', as the case may be. Assuming, for purposes of illustration, that displacement handwheel 4 is operated without any rate being fed in by device 13, traveling nut 110 will eventually be driven against clutch member 111, causing it to engage member 112 and rotate shaft 133 through clutch member 113. Nut 135 will thereby be moved toward engagement, say, with collar 136'. In moving 135, the rotation of shaft 133 displaces ball carriage 14 to a position which sets up a maximum rate of rotation of shaft 18 in a direction tending to cause shaft 133 to reverse its direction of rotation. If handwheel 4 is rotated at a faster rate than the maximum set in by device 13, nut 135 will engage collar 136' and further rotation of handwheel 4 will thereby be prevented. When the rate of rotation of handwheel 4 is less than the maximum set in by device 13, which includes the case when handwheel 4 is prevented from rotating by the engagement of 135 and 136', nut 135' will be moved to its mid position due to the rate set in by device 13 and, in moving to said mid position, will return ball carriage 14 to its central or zero position, thus stopping range changes from being fed into the machine. Contacts 115, 115' may also be provided, to be engaged by the nut 110 so as to be opened to stop the range difference motor when the limit of position is approached on the future mechanism 22' as shown in the wiring diagram of the motor in Fig. 9.

As above stated, nut 110' provides a stop on the present range drive and operates in a manner similar to the future range drive stop just described. At the limit of its travel, nut 110' causes the engagement of clutch members similar to 111 and 112 and thereby causes shaft 134 to be rotated and nut 135 to be moved toward engagement with collar 136 or 136'.

Our preferred method of determining the displacement of the target that takes place during the time of flight of the shell is by measuring the rate of movement along each component and multiplying the same by the time of flight of the shell. The rates of movement of the two slides 48 and 36 of the mechanism 22 are of course proportional to the rate of movement of the target in the two component directions. Therefore the movements of the two slides are connected to rate and displacement determining devices which constitute a marked improvement over the rate and displacement devices of said prior patent and which are substantially the same as shown in Fig. 5 of the aforesaid Patent No. 2,206,875, reproduced herein as Fig. 2. For simplicity of explanation of the operation of the prediction mechanism, the predicted change of target displacement is shown in Fig. 2 as being added directly to the present target position to arrive at the future target position. Actually, according to the principles of the invention as described above and shown in Fig. 1, the addition of the prediction displacement is made with the aid of a servo mechanism comprising, in the $x$ component drive, follow-up contacts 66' and in the $y$ component drive follow-up contacts 66, these contacts controlling the operation of range and azimuth difference motors 52 and 55. The essential element of the device is a variable speed gear comprising a power driven disc with a radially adjusted ball carriage thereon, a cylinder driven thereby, and a three arm differential or equivalent, one arm of which is driven at a rate proportional to the rate of target displacement along a given axis, another arm of which is driven by said cylinder, and the third arm adjusts the radial position of said ball carriage. The result is that the position of said carriage is automatically adjusted in accordance with the rate of target movement until a position of equilibrium is reached, at which time its radius or distance from the center of rotation of the disc is in part determined by the target's rate (R) and would be proportional to that rate if the disc were driven at a constant speed. However, by varying the speed of rotation of the disc inversely in accordance with the time of flight of the shell (1/T), the two factors (R) and (1/T) may be divided to derive RT, or the displacement of the target during the time of flight of the shell, which is the quantity actually represented by the displacement of the ball carriage. Somewhat similar variable speed drives are also employed in obtaining 1/T and also the wind correction.

As shown, the $x$ component from slide 36 is introduced through pinion 40 and shafts 70, 71 which turn one arm of differential 72, the middle arm of which is driven from a roller 73 of the wind correction mechanism 74, and the third arm of which drives one arm of a second differential 75. The opposite arm of said differential 75 is driven by the roller 76 of the variable speed gear 77, while the third arm positions the ball or balls 78 of gear 77 radially on rotated disc 79. Said disc is preferably rotated at variable speed from the roller 80 of the third variable speed gear 81, the radially adjustable balls of which are positioned from the lift of the cam pin 82 on the cam T, which lift is inversely proportional to the time of flight of the shell (1/T). Cam T is preferably also three-dimensional and is positioned rotationally and axially in proportion to the future horizontal range ($R_p$) and altitude (H) by means hereinafter described, giving future slant range with which T varies.

Disc 84 of gear 81 is constantly driven as from a constant speed motor 85, which may also serve as a source of power for the constant speed discs of the $x$ wind correction gear 74 (disc 86) and the $y$ wind correction gear 87 (disc 88). Disc 79 will therefore be driven from cylinder 80 at a rate proportional to 1/T, and since shaft 71 is rotated at a speed corresponding to the linear velocity of the slide 36, i. e., the component target velocity (compensated for wind) along the $x$ axis, and the rotation of cylinder 76 must match this rotation for equilibrium of differential 75, it can be shown that the radial position of the ball 78 will represent $$\frac{R}{\frac{1}{T}}$$

or, in other words, RT, representing the predicted movement of the target along the $x$ axis during the time of flight of the shell. This quantity appears as a rotation of shaft 89, turned from a pinion meshing with the rack bar 90 connected to ball carriage 78, and is added to the present position of the slide 36 through shafts 89 and 91. In the simplified arrangement of Fig. 2, this addition is shown as occurring directly in differential 63'. As noted above a servo mechanism controlled by the output of differential 63' is used in practice to secure sufficient power for driving the future position slides, which occurs indirectly through the operation of the future range and azimuth drives.

The wind correction from device 74 is added to the actual rate of target movements as an accelerating or retarding factor by the differential 72, so that it is this corrected rate that is fed into device 77 through differential 75. The ball carriage 92 of the wind correction device is radially displaced by handwheel 93 in accordance with the $x$ component velocity of the wind as it affects the shell. Cylinder 73 is therefore driven at a velocity proportional to the $x$ component of wind velocity. Thus the wind deflection rate and the target rate are combined with the time of flight of the shell through device 77 in one operation, to give the total correction in the present position.

The prediction mechanism for the $y$ axis may be identical with that above described. The movement of the slide 42 is transmitted through shaft 95 to the first differential 72'. The $y$ wind correction device is shown at 96, set from handle 97, and the R$y$ and RT device is at 77', the disc of which is rotated from the same 1/T device 81 that rotates disc 79 of device 77. The change of target position is indicated by the radial position of the ball carriage 78' of device 77', which is transmitted through shafts 98 and 98' to differential 64, where it is combined with the present position as described above, to actuate the contacts 66.

The future mechanism receives the predicted coordinates of the target position, from which the future range ($R_p$) and future azimuth angle ($A_p$) are determined by the angular position of gears 25' and 30' in a manner similar to that described in connection with gears 25 and 30 of the present resolving mechanism, except that the future resolving mechanism serves to convert Cartesian or rectilinear coordinates to polar coordinates. Gear 25' has a spiral groove and gear 30' a radial groove, while a block (not shown) similar to sliding block 34 and cooperating with said two grooves represents future target position. The power for rotating gears 25' and 30' is supplied by range difference motor 55 and azimuth difference motor 52. These motors are controlled by follow-up contactors 66 and 66', respectively. The Cartesian coordinates of the position of the sliding block are determined by the positions of the slides 36' and 60, the block standing at their intersection, while the polar coordinates of the position of the block are determined by the angular displacement of gears 25' and 30', the angular position of gear 30' determining future azimumth ($A_p$) and the angular displacement of gear 25' determining radial displacement of the block, which is proportional to future range ($R_p$). Future azimuth ($A_p$) is represented by the rotation of shaft 51, which is transmitted to the future azimuth indicator ($A_p$) and transmitter 99.

A consideration of the problem being solved by the future resolving mechanism will show that it converts the two rectilinear coordinates of the future position of the target into polar coordinates, horizontal range $R_p$ and azimuth angle $A_p$, or, in other words, that the mechanism solves for two unknowns simultaneously and that the entire system continuously integrates for these unknowns, the machine operating by what may be termed the flow method, by which the correct future position is obtained very quickly although every change in each variable alters the setting for the other variables. Therefore, both motors 52 and 55 operate simultaneously and each influences the position of the other.

Since the gunners must know the "quadrant elevation" at which the guns must be pointed, which is the sum of the future elevation angle and the "super" elevation, and since both future elevation and superelevation are functions of future horizontal range $R_p$ and altitude H, we prefer to compute the sum of the two on the same cam QE to give quadrant elevation. Future range $R_p$, represented by the rotation of the shaft 57, may therefore be used to rotationally position the shaft 150 of the cam QE by way of shaft 57', and also F and T, i. e., the quadrant elevation cam, the fuse setter's cam and the time of flight cam. Altitude H is supplied to translate these cams by way of shafts 101 and 102.

With the QE cam properly laid out, therefore, the lift of the pin 104 thereon will represent the quadrant elevation, i. e., future elevation plus superelevation, this lift being transmitted through rack and pinion 105 to rotate quadrant elevation transmitter 106 to send out quadrant elevation to the guns. At the same time, the fuse setter data may be sent out from the transmitter 107, actuated from the pin 108 on the fuse setter's cam F.

The preferred form of setting handle is shown in Figs. 4 and 5. This handle may be used at any one of the setting knobs positioned in the director, where an irreversible connection is desired, that is, a drive which cannot be driven by reflex action from the director mechanism. The knob or handle 119 is shown as secured to a stub shaft 120 journaled in the wall 121 of the director. To the inner face of the director is secured annular clutch teeth 122 normally engaged by the slidable clutch member 123, slidably but non-rotatably mounted on an extension of the shaft and normally held in engagement by spring 124. The shaft 120 is shown as provided with a cross pin 125 which engages at its opposite ends V-notches 126 in the inner end of the hub 127 of clutch 123. Normally, therefore, the member 123 is held against turning, but when crank 119 is turned, member 123 is pushed backwardly out of engagement with the clutch teeth 122 so that it may be turned from the handle 119, the hub being splined on shaft 120. The rotation of the member 123 is transmitted to a pinion (not shown) meshing with gear teeth 128 on member 123. By this mechanism the use of large gear reduction worm gearing, which was formerly used to make such drives irreversible, is avoided.

In practice it was found that the range and azimuth difference motors 52 and 55 tended to hunt when near the position of rest, so that first one and then the other motor would run a short distance, causing an unstable condition. To prevent this, we have devised a means for intermittently interrupting the circuit to one or preferably both motors when the position of rest is approached.

Referring to the wiring diagram in Fig. 8, in which similar parts have the same numbers as in the other figures, the reversing switch 66 of the range difference motor has been replaced by a special switch 166, which switch is actuated from the same arm of differential 64 that is shown as carrying the contact 66 in Fig. 1A. To this end, idler gear shaft 170 is shown as driven from the third arm of differential 64 and as driving a gear 171. Said gear has a two way spring connection 172 to a disc 173, to the face of which is secured a block 174 carrying two pairs of flexible contacts 175, 175' and 176, 176'. The cooperating contacts for pair 175, 175' are closer to their respective contacts than the cooperating contacts for 176, 176', so that the former are brought into engagement before and are opened after the latter. It should be observed that the spring connection 172 will permit one of the gears 171 or 173 to advance or lag behind the other gear almost a complete revolution without any loss of synchronism, since when the motor catches up, the switch will be opened and the spring returned to its neutral position. The machine may hence be easily so designed that it is impossible to lose synchronism by using the proper gear ratio with respect to the maximum prediction of which the machine is capable. At 177 is shown a circuit interrupting switch which is actuated continuously from a motor 178 driving a cam 179. Said interrupter is short-circuited and ineffective when either of contacts 176, 176' is closed, but becomes effective when the contacts are open and either of contacts 175, 175' is closed. Said pairs of contacts operate to drive the motor 55 in one direction or the other. As shown, the motor has a double wound shunt field 180, 180', current being sent through one or the other winding to drive the motor in either direction, according to which way block 174 is rotated. An additional switch 181 may be provided in the armature circuit and operated from a coil 182 in series with both fields, so that when both field circuits are open, the armature circuit is also open. Coil 182 also operates to release a brake shoe 183 which is otherwise held on the brake drum 184 on the armature shaft by spring 185, so that the armature is quickly brought to rest when the motor circuits are open. This also avoids driving the future resolving mechanism from the range and azimuth difference motors through irreversible worm drives.

In this diagram, which shows the range difference motor, limit switches 115, 115' are also shown. In case of the azimuth difference motor the construction is substantially the same, except that no limit switches are employed.

In operation, it will be seen that although the interrupter is operating at all times, it only becomes effective when the positions of the disc 173 and gear 171 become almost the same or, in other words, when the mechanism is approaching its position of rest, at which time the short-circuit of the interrupter is broken at one of contacts 176 or 176'. Thereafter, the circuit of the motor is intermittently interrupted to prevent hunting as long as the switches 175, 175' remain closed, i. e., until the motor stops.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

Having described our invention, what we claim and desire to obtain by Letters Patent is:

1. In a fire control director, resolving mechanism for converting the polar coordinates of present range and bearing into rectilinear coordinates, means for determining future rectilinear coordinates therefrom, resolving mechanism for reconverting future rectilinear coordinates into future range and bearing, variable speed power means for feeding range changes into said mechanisms, manual means for independently feeding range changes into said mechanisms, a member in each of said mechanisms positioned in accordance with the range setting therein, and means for preventing excessive travel of said members including stop means associated with each for reducing the output speed of said power means to zero and preventing operation of said manual means when the value of range fed into either of said mechanisms exceeds a predetermined value.

2. In a resolving mechanism for fire control directors, a disc having a spiral slot rotated in accordance with horizontal range, a second disc having a radial slot rotated in accordance with target bearings, a follower constrained to move in two perpendicular directions and engaging both slots, means for converting the movements of said follower in one of said directions into movements in a direction parallel to the other direction including a differential, one arm of which is turned from the aforesaid movements of the follower, and another arm of which engages a fixed part, and a slide mounted for movement parallel to said other direction actuated by the third arm of said differential.

3. In a fire control director, resolving mechanism for converting the present range and present bearing angle of the target into rectilinear coordinates including an $x$ slide and a $y$ slide mounted for independent movement, resolving mechanism for converting the rectilinear coordinates of predicted or future target position into range and bearing angle including an $x$ slide and a $y$ slide mounted for independent movement, a member positioned in accordance with the differential displacement of said two $x$ slides, a controller jointly positioned in accordance with the position of said member and with the calculated change in the $x$ position of the target during the time of flight of the shell, a second member positioned in accordance with the differential displacement of said two $y$ slides, a second controller jointly positioned in accordance with the position of said second member and with the calculated change in the $y$ position of the target during said time, and azimuth and range difference motors actuated by said controllers.

4. In a computing mechanism for gunfire control, a variable speed drive including means for setting the output speed thereof as a measure of the rate of change of a variable coordinate of target position, manual means movable in accordance with changes in said variable coordinate of target position, a member continuously positioned by both the output of said drive and said manual means, and stop means actuated upon displacement of said member beyond a critical position to lock said manual means against further movement and to adjust the speed setting means thereof to a zero speed setting to thereby prevent continuing output from said drive.

5. In a fire control director including a coordinate transformation mechanism, a member in said mechanism positionable to represent a coordinate of target position, manual and power means operable to feed independent displacements into said mechanism proportional, in combination, to change of target position to position said member, said power means having an adjustable speed controller, means actuated upon displacement of said member beyond a critical position for adjusting said controller to a zero speed setting, and means cooperative with said last means and actuated therewith to prevent further operation of said manual means.

6. In a fire control director including a coordinate transformation mechanism, a member in said mechanism displaceable to represent change of a coordinate of target position, power means operable to feed displacements into said mechanism proportional to a change of target position, thereby to displace said member, said power means having an adjustable speed controller, and means actuated upon displacement of said member beyond a critical position for adjusting said controller to a zero speed setting to prevent continuing displacement of said member by said power means.

7. In a resolving mechanism for fire control directors, a support, a carriage mounted on said support for displacement relative thereto in a first direction to represent a component of target displacement, a member mounted on said carriage for displacement relative thereto in a second direction perpendicular to said first direction to represent another component of target displacement, differential means mounted on said carriage having one arm thereof actuated in accordance with displacement of said carriage relative to said support and a second arm thereof actuated in accordance with displacement of said member relative to said carriage, the third arm of said differential means including a pinion, a rack slidingly mounted on said support and engaging said pinion, said rack being displaced by said pinion in proportion to the displacement of said member relative to said carriage, motion of the differential means as a whole with the carriage being cancelled by said actuation of the first arm thereof.

8. In a fire control director comprising present target position resolving means actuated in accordance with polar coordinates of present range and azimuth to position a member in two dimensions in accordance with corresponding present $x$ and $y$ coordinates, future target position resolving means actuated in accordance with polar coordinates of future target range and azimuth and positioning a member in two dimensions in accordance with corresponding future $x$ and $y$ coordinates, and means furnishing measures of predicted change of target position in the $x$ and $y$ dimensions during flight of the projectile, means for determining the differences between the $x$ coordinates and the $y$ coordinates, respectively, of the positions of said two members, means for comparing said differences respectively with said computed compute component changes of target position to obtain the respective differences therebetween, and range and azimuth difference motors actuated in accordance with said last named differences to effect differential displacements between the present and future resolving means.

EARL W. CHAFEE.
SHIERFIELD G. MYERS.